United States Patent
Joshi et al.

(10) Patent No.: US 9,523,988 B2
(45) Date of Patent: Dec. 20, 2016

(54) PRESSURE REDUCING VALVES WITH MULTIPLE HEADS AND SEATS

(75) Inventors: Milind Arvind Joshi, Pune (IN); Prashant Ramchandra Ranade, Pune (IN)

(73) Assignee: Forbes Marshall Steam Systems Private Limited, Pune (IN)

(*) Notice: Subject to any disclaimer, the term of this patent is extended or adjusted under 35 U.S.C. 154(b) by 436 days.

(21) Appl. No.: 13/516,155

(22) PCT Filed: Dec. 22, 2010

(86) PCT No.: PCT/IN2010/000841
§ 371 (c)(1),
(2), (4) Date: Jun. 14, 2012

(87) PCT Pub. No.: WO2011/077456
PCT Pub. Date: Jun. 30, 2011

(65) Prior Publication Data
US 2013/0008531 A1  Jan. 10, 2013

(30) Foreign Application Priority Data
Dec. 22, 2009 (IN) .......................... 2950/MUM/2009

(51) Int. Cl.
*G05D 16/06* (2006.01)
*G05D 16/16* (2006.01)

(52) U.S. Cl.
CPC ........ *G05D 16/163* (2013.01); *G05D 16/0605* (2013.01); *G05D 16/0638* (2013.01);
(Continued)

(58) Field of Classification Search
CPC .............. G05D 16/163; G05D 16/0605; G05D 16/0638; G05D 16/0694; Y10T 137/7795; Y10T 137/7797; Y10T 137/7801; Y10T 137/7805
(Continued)

(56) References Cited

U.S. PATENT DOCUMENTS 1,546,356 A * 7/1925 Anderson ............ G05D 16/163
137/492
1,706,230 A  3/1929 Hilger
(Continued)

FOREIGN PATENT DOCUMENTS

GB  323286  1/1930
GB  1143318  2/1969

OTHER PUBLICATIONS

International Search Report mailed Jun. 28, 2011, International Application No. PCT/IN2010/000841 filed Dec. 22, 2010.

*Primary Examiner* — William McCalister
(74) *Attorney, Agent, or Firm* — Wiley Rein LLP (57) ABSTRACT

The present invention provides a pressure reducing valve. The pressure reduction valve includes a main body, an inlet, an outlet, a stem, a main seat, a pilot diaphragm, a main head, and a control spring. The pressure reduction valve includes additional auxiliary seats with corresponding auxiliary heads and displacement members/surfaces. The pressure reduction valve additional includes auxiliary seats with corresponding auxiliary heads and displacement members/surfaces enables stage wise opening of the secondary seats and the main seat. This enables to meet highly varying media flow demands using single pressure reduction valve, having less hunting effect and eliminating use of multiple pressure reduction valves.

3 Claims, 5 Drawing Sheets

(52) U.S. Cl.
CPC .... *G05D 16/0694* (2013.01); *Y10T 137/7795* (2015.04); *Y10T 137/7801* (2015.04); *Y10T 137/7805* (2015.04)

(58) Field of Classification Search
USPC ............. 137/505.12, 505.14, 505.18, 505.22
See application file for complete search history.

(56) References Cited

U.S. PATENT DOCUMENTS

| | | | |
|---|---|---|---|
| 2,278,952 A * | 4/1942 | Soderberg | G05D 16/163 137/102 |
| 2,891,569 A * | 6/1959 | Goodner | A62B 9/022 137/505.12 |
| 3,054,414 A * | 9/1962 | Blackwell | B63C 11/2209 137/505.12 |
| 3,319,649 A * | 5/1967 | Cummins | F16K 39/022 137/505.18 |
| 3,592,223 A * | 7/1971 | Reese | F16K 31/36 137/245 |
| 2006/0260692 A1 | 11/2006 | Pechtold | |
| 2008/0047619 A1* | 2/2008 | Pechtold | G05D 16/10 137/505.41 |
| 2008/0257421 A1* | 10/2008 | Kranz | F16K 17/32 137/461 |
| 2009/0120513 A1 | 5/2009 | Chang et al. | |

* cited by examiner

PRESSURE REDUCING VALVES WITH MULTIPLE HEADS AND SEATS

CROSS-REFERENCE TO RELATED APPLICATIONS

This application is a National Stage of International Patent Application PCT/IN2010/000841, filed Dec. 22, 2010, which claims priority to foreign Indian Patent Application No. 2950/MUM/2009, filed Dec. 22, 2009, the disclosures of which are incorporated by reference in their entireties.

FIELD OF THE INVENTION

The present invention relates to a pressure reducing valve, more particularly, the present invention relates to a pressure reducing valve having multiple of heads and seats.

BACKGROUND OF THE INVENTION

Generally, pressure reducing valves (hereinafter referred as 'PRV') are used in steam industry to reduce pressure of boiler steam to the point of application (process equipment). The PRV available at present performs perfectly well when pressure & flow condition (upstream & downstream) are fairly stable. However, in process industries, steam demand always varies. When process starts, pipeline & all products are cold & it is required to heat them up as fast as possible. This needs higher steam flow rates. Once, the temperature reaches the desired degrees, the demand of flow drops. Further, flow is required only to cater fluid/media heating & take care of heat losses.

In general, two PRV are provided in parallel on the pipe lines to fulfill the pressure reduction requirement. Both PRVs are initially set 'ON' to meet higher demands. Additionally, a smaller PRV is used to meet low flow demands.

Figure 1:
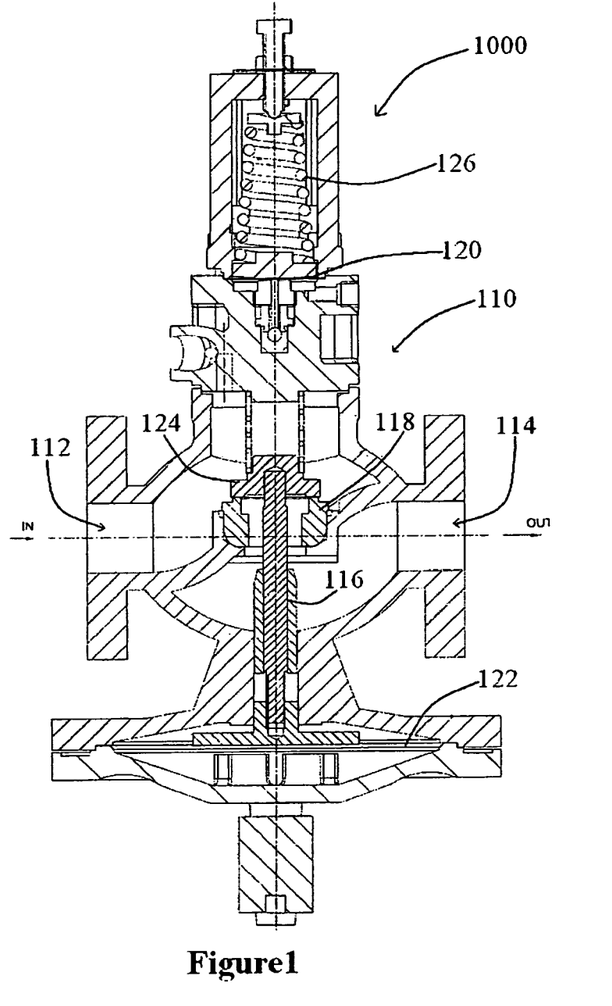
FIG. 1 show a front view of the pressure reducing valve of the prior art.
Figure 5:
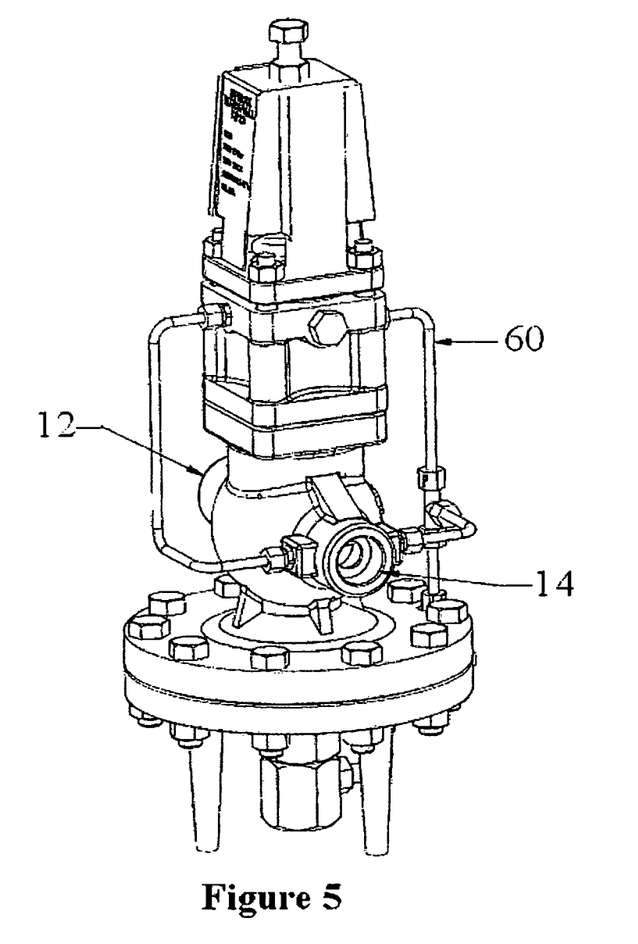
FIG. 5 shows a perspective view of the pressure reduction valve.

Referring to FIG. 1 show a front view of the pressure reducing valve (1000) of the prior art. The pressure reducing valve (1000) includes main body (110), an inlet (112), an outlet (114), a stem (116), a seat (118), a pilot diaphragm (120), a main diaphragm (122), and a head (124). The pressure reducing valve (1000) works by balancing downstream pressure through a pressure sensing pipe (60) (refer FIG. 5) against a pressure adjustment control spring (126). The sensing pipe (60) provides a passage for the media between the main diaphragm (122) and the pilot diaphragm (120). The required amount of pressure is adjusted by adjusting the control spring (126). The main diaphragm (124) is larger as compared to the pilot diaphragm (120). Upon reaching a desired pressure, the pressurized media pressurizes the pilot diaphragm (120) and the main diaphragm (122). As the area of the main diaphragm (122) is more, as compared to the area of the pilot diaphragm (124) mechanical advantage is achieved and offers accuracy with small proportional offset, therefore the main diaphragm (122) moves upwards.

The upward movement of the main diaphragm (122) moves the stem (116) upward, thereby lifting the head (124) away from the seat (118) for enabling the media to egress out from the outlet (114) to modulate a control pressure. Further, under stable conditions, pressure below pilot diaphragm (122) balances force against control spring (126), and the pressure transferred below main diaphragm (122) is also constant, therefore balanced condition is achieved.

When downstream pressure rises, pressure below the pilot diaphragm (120) is greater than force created by the control spring (126), the pilot diaphragm (120) pushing a pilot seat to closer condition. This interrupts pressure below main diaphragm (122). As there is always a pressure on top of main diaphragm (122) (downstream pressure) & now this is more than the pressure under the main diaphragm (122), this transfers the pressure through control pipe (60) & surplus pressure orifice, thereby balancing pressure therebetween.

Further, ratio of maximum to minimum controllable flow is called "rangeability" of the PRV. If one oversized PRV is used instead of two (one small & one large), then phenomenon called hunting occurs. Hunting means the valve opens to cater to the flow but the demand being very low tries to shut down again and this cycle continues.

With this hunting, the head (124) of the PRV (1000) will try to come closer to the seat (118) while passing wet steam causing wiredrawing & premature erosion which will reduce life of the head (124) and the seat (118). In addition, any small movement of oversized head will produce a relatively large change in flow of the PRV (1000) making it more difficult to control accurately. In short, range-ability of the PRV (1000) is limited. When the PRV (1000) is used in this condition, all parts reach their fatigue life very quickly and fail.

OBJECT OF THE PRESENT INVENTION

Object of the present invention is to provide a pressure reducing valve, which is capable of meeting highly varying media flow demands within single embodiment.

Another object of the present invention is to provide a pressure reducing valve, which has less hunting effect.

Yet another object of the present invention is to provide a pressure reducing valve, which is capable of eliminating use of plurality of pressure reduction valves with different pressure settings.

SUMMARY OF THE INVENTION

According to the present invention there is provided a pressure reduction valve comprising:
  a body;
  an inlet and an outlet for media;
  a stem secured to a main diaphragm;
  a main head secured to the stem;
  a main seat for disposing the main head thereon for closing, and opening the flow of media therethrough;
  a control spring for adjusting pressure for opening the main head;
  a first spring disposed over the main head to resist the movement thereof;
  a pilot diaphragm to act against the control spring pressure; and
  a sensing pipe for connecting the main diaphragm, characterized in that pressure reduction valve comprising:
  a first displacement surface configured on the stem for lifting the main head thereof;
  a plurality of openings configured on the first displacement surface for passage of media therethrough;
  a first auxiliary seat configured on the main head;
  a first auxiliary head adapted to cover and uncover the first auxiliary seat to close and open the media flow therethrough;
  a second spring disposed over the first auxiliary head to resist the movement thereof;
  a second displacement surface configured on the stem for lifting the first auxiliary head thereof;
  a second auxiliary seat configured on the first auxiliary head;

a second auxiliary head adapted to cover and uncover the first auxiliary seat to close and open the media flow therethrough; and a third spring disposed over the second auxiliary head to resist the movement thereof, wherein in closed condition distance between the first displacement surface and the main seat is more than distance between the second displacement surface and the first auxiliary head, therefore upon lifting the stem by the main diaphragm, initially the second auxiliary head is lifted then the first auxiliary head and then the main head.

Typically, wherein the first spring, the second spring, and the third spring are compression springs.

Typically, wherein the second auxiliary head is spherical in shape.

According to an embodiment of the present invention there is provided a pressure reduction valve comprising:

a body;

an inlet and an outlet for media;

a stem secured to a main diaphragm;

a main head secured to the stem;

a main seat for disposing the main head thereon for closing and opening the flow of media therethrough;

a control spring for adjusting pressure for opening the main head;

a first spring disposed over the main head to resist the movement thereof;

a pilot diaphragm to act against the control spring pressure; and a sensing pipe for connecting the main diaphragm, characterized in that the pressure reduction comprising:

a displacement surface configured on the stem for lifting the main head thereof;

a plurality of openings configured on the main head for passage of media therethrough;

a plurality of auxiliary seats corresponding to each of the openings of the plurality of openings configured on the main head;

a plurality of auxiliary heads adapted to cover each of the auxiliary seats of the plurality of auxiliary seats for regulating the media flow therethrough;

a plurality of springs disposed over the each of the auxiliary head of the plurality of auxiliary heads to resist the movement thereof; and a plurality of displacement members configured over the displacement surface for lifting the each of the auxiliary heads of the plurality of auxiliary heads thereof;

wherein each of the displacement member of the plurality of the displacement members having different length as compared to other displacement member, each of the displacement member lifts each of the auxiliary head of the plurality of auxiliary heads upon lifting the stem by the main diaphragm sequentially, and thereafter the main head is lifted by the displacement surface.

Typically, wherein each of the spring of the plurality of springs is a compression spring.

BRIEF DESCRIPTION OF THE INVENTION

FIG. 4b shows a top view of the pressure reducing valve of FIG. 4a; and

DETAIL DESCRIPTION OF INVENTION

The foregoing objects of the invention are accomplished and the problems and shortcomings associated with the prior art techniques and approaches are overcome by the present invention as described below in the preferred embodiment.

The present invention provides a pressure reducing valve. The pressure reduction valve includes a main body, an inlet, an outlet, a stem, a main seat, a pilot diaphragm, a main diaphragm, a main head, and a control spring. The pressure reduction valve includes additional auxiliary seats with corresponding auxiliary heads and displacement members/surfaces. The pressure reduction valve additional includes auxiliary seats with corresponding auxiliary heads and displacement members/surfaces enables stage wise opening of the secondary seats and the main seat. This enables to meet highly varying media flow demands using single pressure reduction valve, having less hunting effect and, eliminating use of multiple pressure reduction valves.

The present invention is now illustrated with reference to the accompanying drawings, throughout which reference numbers indicate corresponding parts in the various figures. These reference numbers are shown in bracket in the following description.

Figure 2:
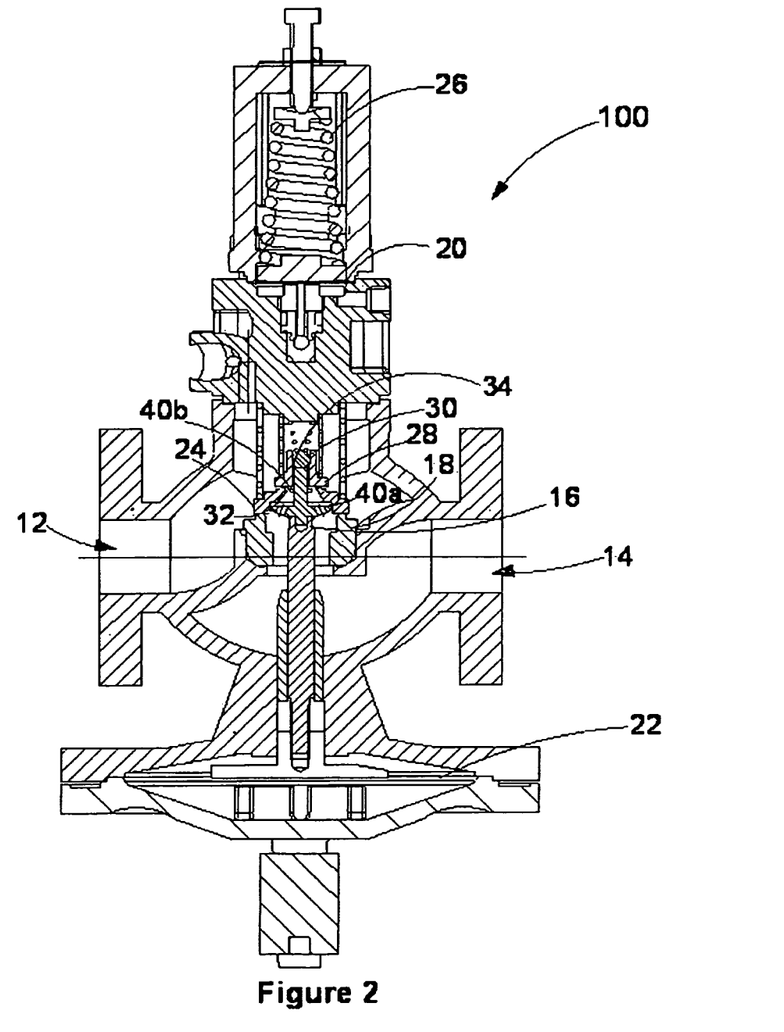
FIG. 2 shows a front sectional view of an embodiment of the pressure reducing valve according to the present invention.
Figure 3:
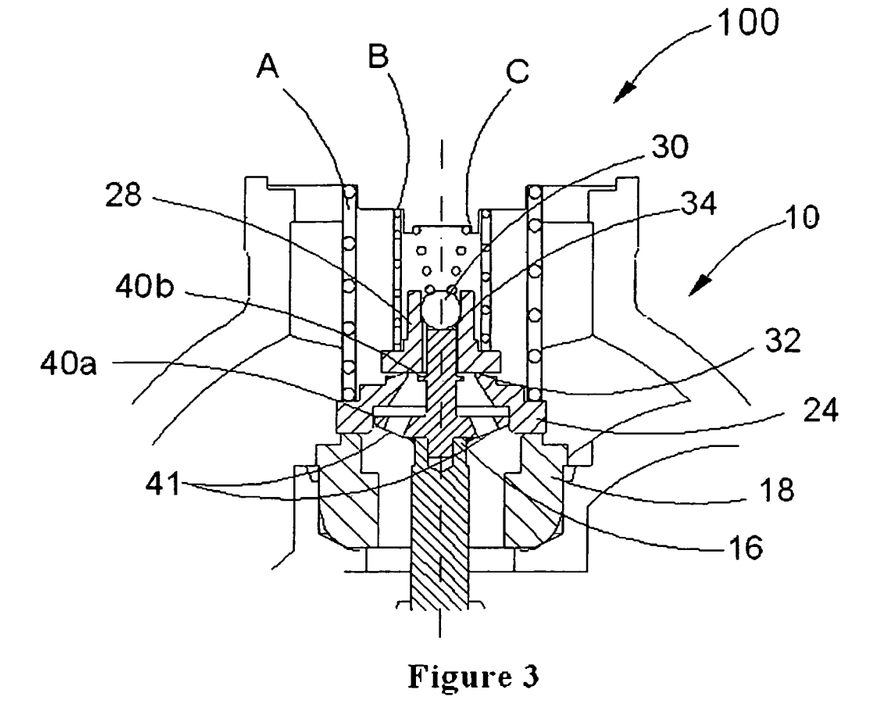
FIG. 3 shows a front sectional enlarged view of the pressure reducing valve of FIG. 2.

Referring now to FIG. 2 and FIG. 3, a pressure reducing valve (herein after referred as PRV (100)) according to the present invention is illustrated. The PRV (100) includes a main body (10), an inlet (12), an outlet (14), a stem (16), a main seat (18), a pilot diaphragm (20), a main diaphragm (22), a main head (24), and a control spring (26). The improvements comprises a first auxiliary head (28), a first displacement surface (40a), a plurality of openings (41), a first auxiliary seat (32), a second auxiliary seat (34), a second auxiliary head (30), and second displacement surface (40b). The PRV (100) works by balancing the downstream pressure via a pressure sensing pipe (60) (refer FIG. 5) against the force of control spring (26). The control spring (26) is used for adjusting the pressure of operation of the PRV (100).

The sensing pipe (60) provides connection between the main diaphragm (22) and the pilot diaphragm (20). Required amount of pressure is adjusted by adjusting compression of the control spring (26). The first displacement surface (40a) is configured on the stem (16) below the main head (24) with a gap therebetween (refer FIG. 2) and second displacement surface (40b) is configured on an upper portion of the stem (16) below the first auxiliary head (28). The gap between the first displacement surface (40a) and the main head (24) is more as compared to the gap between the second displacement surface (40b) and the first auxiliary head (28). The first displacement surface (40a) has plurality of openings (41) for passage of media therethrough. The first auxiliary seat (32) is configured on the main head (24). The first auxiliary head (28) is adapted to cover and uncover the first auxiliary seat (32) to close and open the media flow therethrough.

Further, the second auxiliary seat (34) is configured over the first auxiliary head (28). The second auxiliary head (30) is provided to cover and uncover the second auxiliary seat (34) for closing and opening media flow through a space between the stem (16) and the first auxiliary head (28). In an embodiment, the second auxiliary head (30) is spherical in shape. Each of the main heads (24), the first auxiliary head (28), and the second auxiliary head (30) is loaded with a first spring (A), a second spring (B) and a third spring (C) respectively. The first spring (A), the second spring (B) and the third spring (C) are selected to give predefined resistance force for the movement of the respective heads (Refer FIGS. 2, & 3). In an embodiment, the first spring (A), the second spring (B) and the third spring (C) are compression springs.

Further, the main diaphragm (22) is larger as compared to the pilot diaphragm (20). Upon reaching a predefined pressure, the pressurized media exerts pressure on the pilot diaphragm (20) and the main diaphragm (22). As the area of the main diaphragm (22) is more, as compared to the area occupied by the pilot diaphragm (20), the main diaphragm (22) exerts more force and moves upward. The upward movement of the main diaphragm (22) moves the stem (16) upward thereby lifting the second auxiliary head (30) away from the second auxiliary seat (34), thereby enabling the media to egress out from the gap created between the second auxiliary head (30), the second auxiliary seat (34) and the stem (16). As the pressure increases, the main diaphragm (22) gets more displaced, thereby lifting the first auxiliary head (28) away from the first auxiliary seat (32) and then the main head (24) away from the main seat (18), thereby enabling escape of media from the gaps.

Under stable conditions, pressure below pilot diaphragm (20) balances force of the control spring (26), and the pressure transferred below the main diaphragm (22) is also constant, therefore balanced condition is achieved.

Figure 4A:
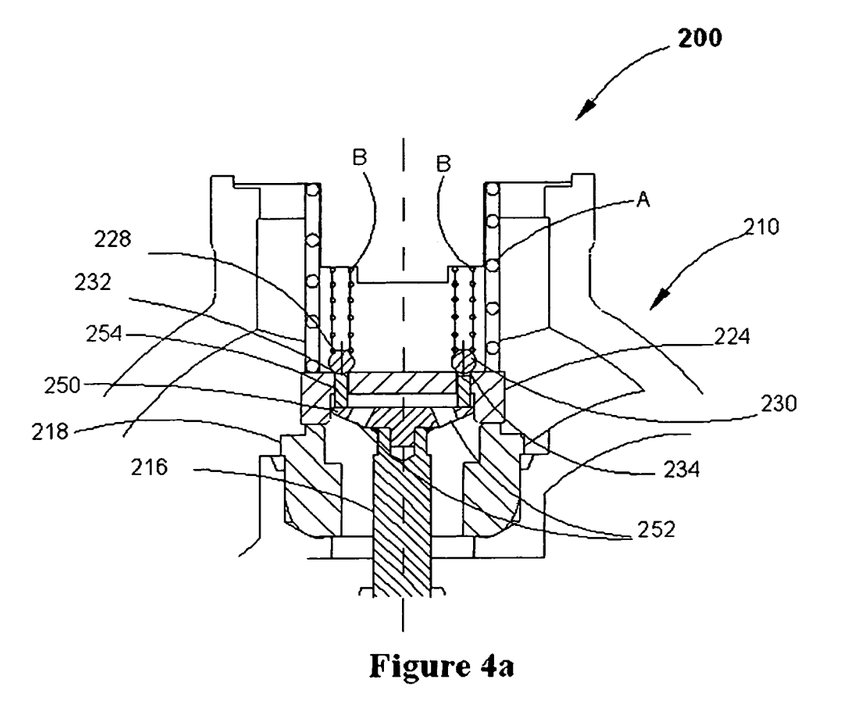
FIG. 4a shows a front sectional enlarged view of another embodiment of the pressure reducing valve according to the present invention.
Figure 4B:
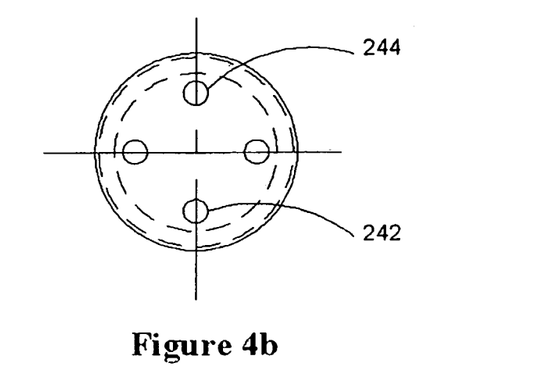

Referring to FIGS. 4a and 4b, another embodiment of pressure reducing valve (herein after referred as PRV (200)) according to the present invention is illustrated. The PRV (200) is shown to include a main body (210), a stem (216), a main seat (218), a main head (224), a control spring (not shown), a main diaphragm (not shown), a pilot diaphragm (not shown), a first spring (A) and a sensing pipe (not shown). The improvement comprises a plurality of auxiliary heads, a plurality of auxiliary seats, a displacement surface (250), openings (252), and displacements members (254). For the purpose of explanation, the PRV (200) is shown to include a first auxiliary head (228), a second auxiliary head (230), a third auxiliary head (242), a fourth auxiliary head (244), a first auxiliary seat (232), a second auxiliary seat (234), a third auxiliary seat (not shown); a fourth auxiliary seat (not shown), the displacement surface (250), the openings (252), and the displacements members (254) (refer FIGS. 4a & 4b).

The main head (224) includes four of openings on which the first auxiliary seat (232), the second auxiliary seat (234), the third auxiliary seat, and the fourth auxiliary seat are configured. The first auxiliary head (228), the second auxiliary head (230), the third auxiliary head (242), and a fourth auxiliary head (244) are adapted to cover the first auxiliary seat (232), the second auxiliary seat (234), the third auxiliary seat, and the fourth auxiliary seat respectively.

Further, each of the auxiliary heads is provided with spring (B) to provide predefined restraining force thereover. The displacement surface (250) is configured on the stem (216) for lifting the main head (224). The present invention is shown to include four openings (252). The openings (252) are configured on the displacement surface (250) for passage of media therethrough in open condition. The first auxiliary head (228), the second auxiliary head (230), the third auxiliary head (242), and the fourth auxiliary head (244) cover and uncover the first auxiliary seat (232), the second auxiliary seat (234), the third auxiliary seat, and the fourth auxiliary seat respectively to close or open passage of media therethrough.

Referring back to FIGS. 4a and 4b, the displacement members (254) are configured over the displacement surface (250). The four displacement members (254) have different lengths. A clearance is maintained between the each of the auxiliary seat and the displacement member (254) for passage of media therethrough. Therefore, the upward movement of the stem (216) initially lifts the first auxiliary head (228), further movement lifts the second auxiliary head (230), then the third auxiliary head (242), then fourth auxiliary head (244), and lastly the main head (224) is lifted consecutively to allow the passage of the media therefrom. This configuration enables opening of the auxiliary seats one after the other and then the main seat (218) with increase in pressure, and closes in the same sequence with decrease in pressure Additional features like upstream and downstream isolation valves with in-built strainer may be offered to improve the life of key components like diaphragm, seats and heads of the PRV (100) and PRV (200).

Thus, capacity of the valve to control maximum to minimum flow is improved by the present invention of the PRV (100) and PRV (200), thereby eliminating use of multiple pressure reduction valves with different pressure settings. Further, the PRV (100) and PRV (200) of the present invention have less hunting effect.

The foregoing objects of the invention are accomplished and the problems and shortcomings associated with prior art techniques and approaches are overcome by the present invention described in the present embodiment.

Detailed descriptions of the preferred embodiment are provided herein; however, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or matter The embodiments of the invention as described above and the methods disclosed herein will suggest further modification and alterations to those skilled, in the art. Such further modifications and alterations may be made without departing from the spirit and scope of the invention.

We claim:

1. A pressure reduction valve comprising:
   a body;
   an inlet and an outlet for media;
   a stem secured to a main diaphragm;
   a main head secured to the stem;
   a main seat for disposing the main head thereon for closing and opening the flow of media therethrough;
   a control spring for adjusting pressure for opening the main head;
   a first spring disposed over the main head to resist the movement thereof;
   a pilot diaphragm to act against the control spring pressure; and
   a sensing pipe for connecting the main diaphragm to the pilot diaphragm; characterized in that the pressure reduction valve comprises:
   a first displacement surface configured on the stem for lifting the main head thereof;
   a plurality of openings configured on the first displacement surface for passage of media therethrough;
   a first auxiliary seat configured on the main head;

a first auxiliary head adapted to cover and uncover the first auxiliary seat to close and open the media flow therethrough;
a second spring disposed over the first auxiliary head to resist the movement thereof;
a second displacement surface configured on the stem for lifting the first auxiliary head;
a second auxiliary seat configured on the first auxiliary head, a second auxiliary head adapted to cover and uncover the second auxiliary seat to close and open the media flow therethrough; and
a third spring disposed over the second auxiliary head to resist the movement thereof;
wherein in a closed condition the distance between the first displacement surface and the main seat is more than distance between the second displacement surface and the first auxiliary head, and wherein lifting of the stem by the main diaphragm initially causes lifting of the second auxiliary head, followed by lifting of the first auxiliary head, and then lifting of the main head.

2. The pressure reduction valve of claim 1, wherein the first spring, the second spring, and the third spring are compression springs.

3. The pressure reduction valve of claim 1, wherein the second auxiliary head is spherical in shape.

* * * * *